Patented Aug. 6, 1935

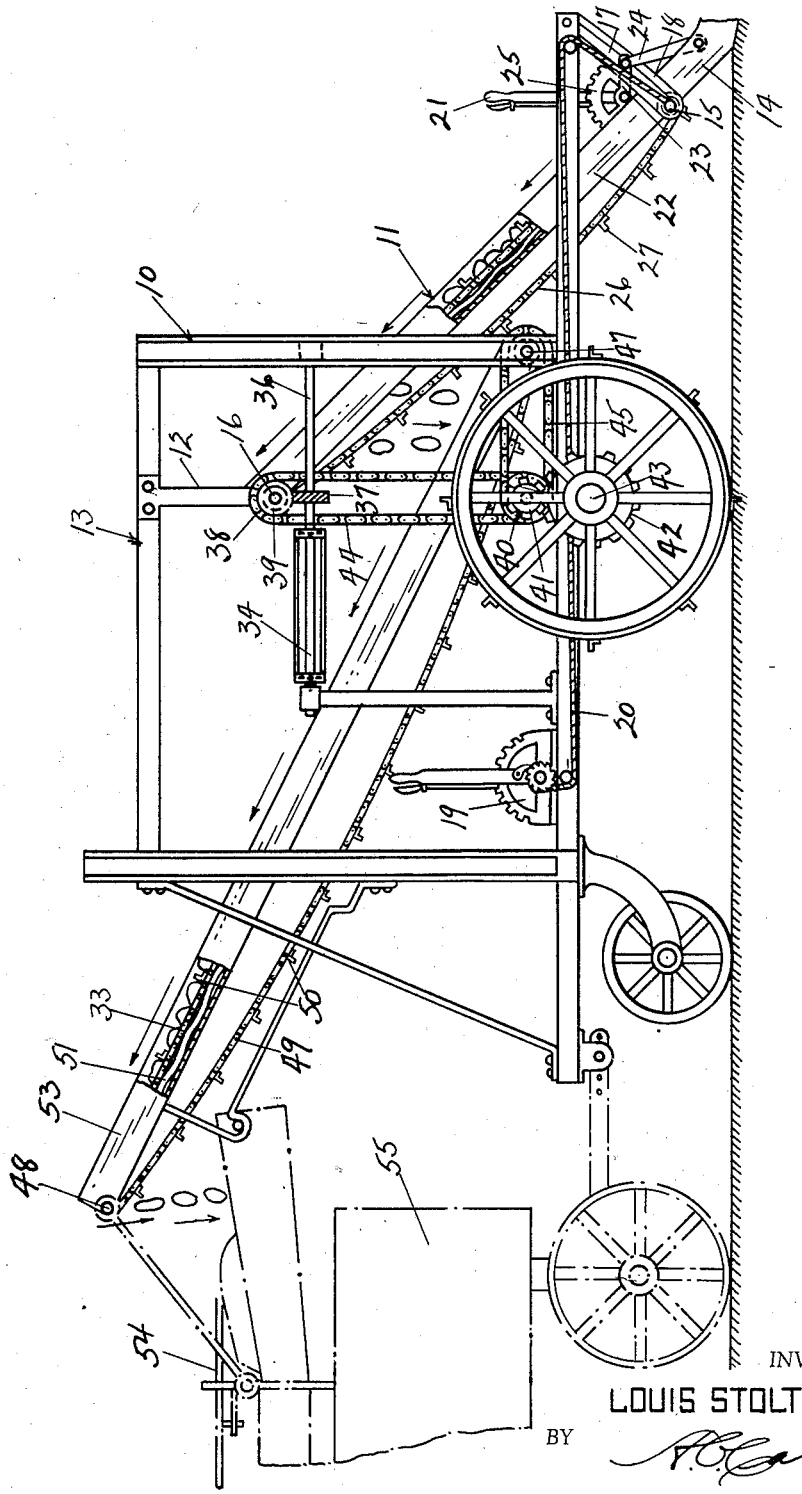

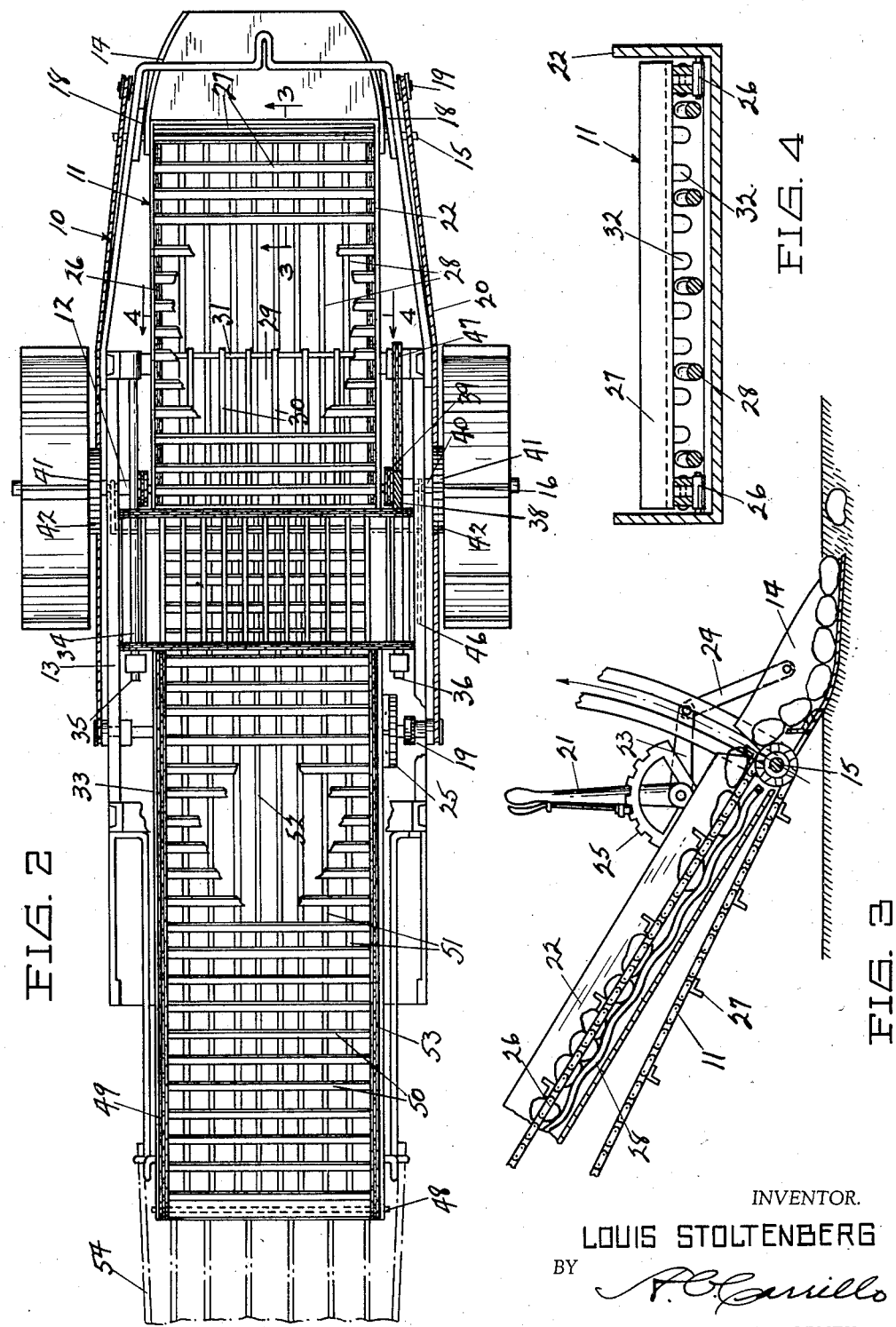

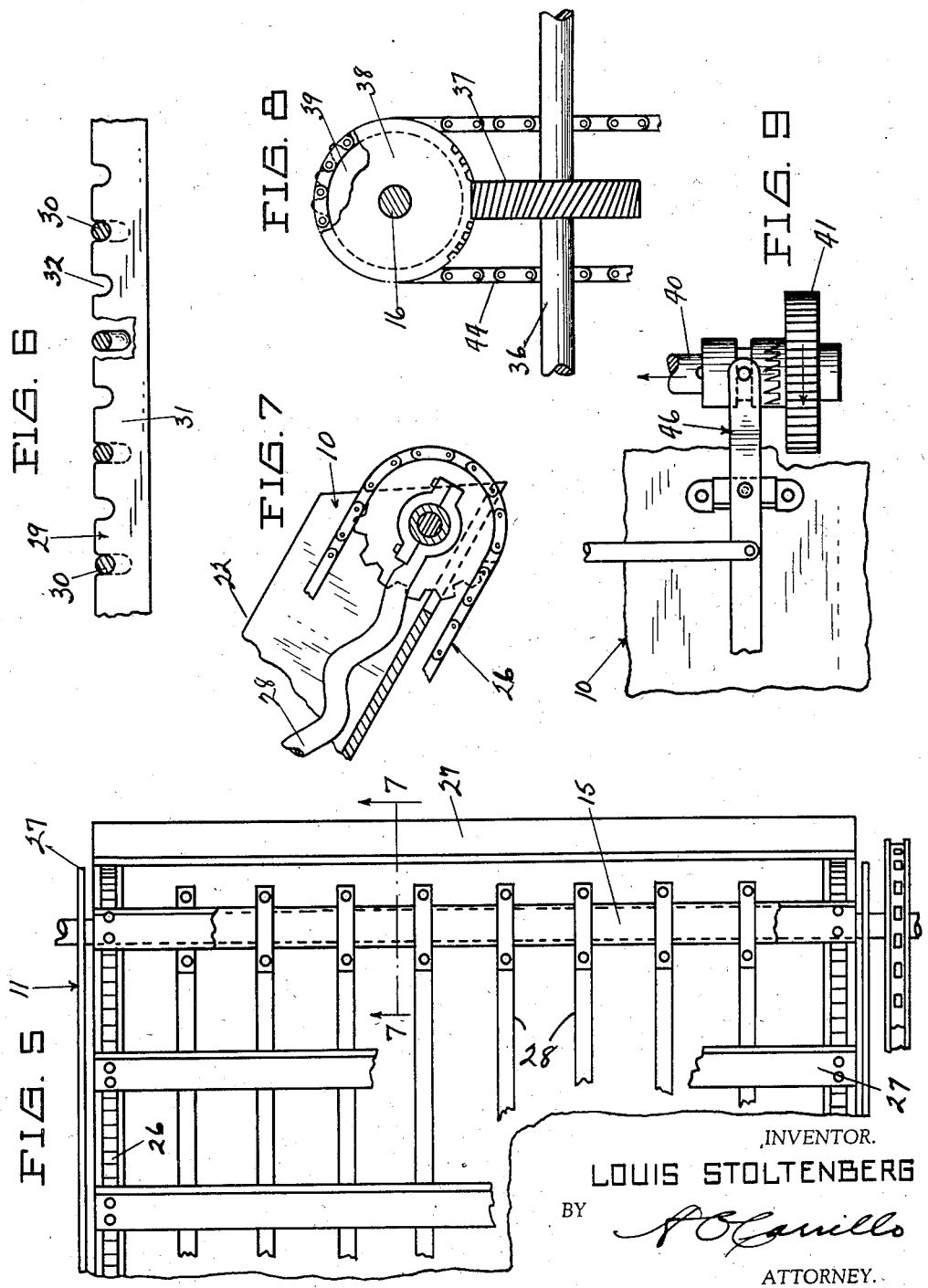

2,010,335

UNITED STATES PATENT OFFICE 2,010,335

POTATO HARVESTING APPARATUS

Louis Stoltenberg, Oakland, Calif.

Application June 1, 1934, Serial No. 728,509

6 Claims. (Cl. 55—135)

This invention relates generally to new and useful improvements in potato harvesters, and embodies various improvements in design and construction over that shown and described in my United States Patent No. 1,487,821, issued March 25th, 1924, for Potato picking machines.

The primary object of my present invention is to provide a combined harvesting apparatus embodying a potato-digging means, a conveying and sifting means, a vine-separating means, a sorting means, and a sacking means.

Another object of the invention is to provide in an apparatus of the class described comprising a conveyor system including a pair of chain conveyors arranged in superposed relation, the upper of which is adjustable and angularly disposed in the forward end of the machine and adapted for adjustably supporting at its lower end a plowshare regulable as to the conveyor and also as to its cutting depth, the lower being fixed and arranged to receive the potatoes as discharged from the upper and convey them rearwardly to be discharged into a sorting mechanism, or upon the ground as may be desired.

A further object of the invention is the provision of an improved conveying means adapted to assist in the assortment of the potatoes as to size and to also sift the dirt and other débris therefrom in their rearward passage from the plow.

Additional to the foregoing is that of providing suitable transversely moving means adapted to assist in the removal of the vines by receiving them from the forward conveyor and depositing them latterly thereof.

Other objects and advantages of the invention will become apparent with the accompanying three sheets of drawings and the accompanying specifications.

Figure 1 is a side elevation, showing a complete assembled machine as it would appear in readiness for instant use;

Figure 2 is a plan view of the apparatus showing portions of the conveyor broken away to permit a greater clearness of illustration;

Figure 3 is an enlarged sectional detail of the plowshare and the lower end of the forward conveyor as it appears in position for operation, the section being indicated by the line 3—3 of Figure 2;

Figure 4 is a transverse section taken through the forward conveyor, the section being indicated by the line 4—4, in Figures 1 and 2 of the drawings;

Figure 5 is an enlarged plan detail of the lower end of the rear fixed conveyor and is illustrative of the constructional details thereof;

Figure 6 is a detailed view illustrating the adjustable rods carried by the upper end of the forward conveyor and through which the potatoes drop to the lower end of the rear, or lower, conveyor;

Figure 7 is a sectional detail, showing the assembly of the conveyor drive shafts and connecting-rod bearings, the section being taken on the line 7—7 in Figure 5;

Figure 8 is an enlarged detail illustrative of the vine-separator driving mechanism; and Figure 9 is a view in detail, showing the clutch mechanism employed in disengaging the main and conveyor drives.

Referring to the drawings with greater particularity, the numeral 10 designates, in a general way, the supporting structure, including frame and wheels, the structure being adapted for connection to any suitable power unit, such as a tractor (not shown).

The forward conveyor 11 is swingably mounted at its upper end in bearing supports 12 carried by the super-structure 13 of the apparatus and is angularly disposed relative to the ground, as shown in Figure 1, with its lower end terminating short of the ground level, and provided at this end with an adjustable plowshare 14 so arranged as to permit its being swung about the lower shaft 15 thereof, the upper shaft 16 being rotatably secured in the bearings 12.

The shaft 15 of the conveyor extends into arcuate guide-slots 17 carried by arcuately disposed braces 18 positioned upon opposite sides of the frame and embracing the lower end of the conveyor, the slots conforming to an arc struck from the center of the shaft 16 in a manner permitting the swinging of the lower end of the conveyor to cause the plowshare 14 to be raised to clear the ground when being transferred from place to place, this operation being accomplished through the action of a hand-lever and ratchet-drum mechanism 19 upon a cable 20 having an end connection with the shaft 15 and adaptable for movement in either direction.

The plow 14 is scoop-shaped, as shown in Figures 1, 2, and 3, and mounted to be raised and lowered, relative to the conveyor shaft 15, by means of a lever 21 carried by the lower end of the conveyor chute 22 and connected with the plow by means of a rigid arm 23 and a link 24, an arrangement permitting its adjustment to any desired cutting or scooping angle and held rigidly to the position by means of the sector 25.

The conveyor 11 comprises the chute 22, the shafts 15 and 16, the spaced side-chains 26, the cross-pieces 27 and the longitudinal rods 28. The rods 28 are properly spaced apart to prevent the potatoes from dropping through but are sufficiently close to allow loose earthy particles to be sifted from the potatoes as they are borne upwardly by the cross-pieces 27 of the conveyor. The weight of the chains 26 and cross-pieces 27 is carried by the rods 28 and the cross-pieces slide thereon in their movement toward the upper end of the conveyor, the potatoes being slidably borne along these rods in advance of the cross-pieces.

The upper end of the conveyor 11 is provided with a separate section 29 consisting of a plurality of removable rods 30 carried by cross-pieces 31, as shown in Figures 2 and 3, and these rods are retained in place by notches 32 adapted for their reception and permitting their adjustment laterally to vary their spacing apart to accommodate the passage therebetween of differently sized potatoes to the lower conveyor 33, the vines and similar débris being carried up and over the end of the conveyor and discharged upon the vine separator 34.

The vine separator and carrier 34 receives the vines and other débris that may not have been disposed of by the conveyor 11 in its travel to this point, together with such potatoes as may still adhere to the vines, and carries these crosswise of the travel of the conveyor, this action serving to detach the remaining potatoes from the vines, these dropping to the conveyor 33, while the vines and other matter are borne transversely and discharged to one side as refuse.

The separator 34 consists of an ordinary link conveyor having wide spaces between the links and mounted upon shafts 35 and 36 carried by the supporting frame. The shaft 36 carries a helical gear 37 meshing with a like gear 38 carried by the conveyor shaft 16, this shaft and the separator shaft 36 being driven by a sprocket wheel 39 also mounted upon the shaft 16, shown in Figure 8.

The lower, or rear, conveyor 33, the forward conveyor 11, and the separator 34 are driven by a shaft 40 mounted upon the platform of the apparatus and having a pinion 41 mounted on opposite ends thereof and meshing with gears 42 carried by the axle 43, the conveyor 11 being connected to the shaft 40 by means of chains and sprockets 44, and the conveyor 33 thereof by means of chains and sprockets 45.

The clutch mechanism 46 of Figure 9, is mounted upon the shaft 40, and operates to cause the disengagement of pinions 41 from the driving gears 42 to stop the actuation of the conveyors while transferring the apparatus from one field of operation to another, or when it is desired that the conveyors remain inactive.

The rear conveyor 33 consists of a lower shaft 47 mounted in bearings carried by the frame and an outer shaft 48, the chains 49 thereof being of ordinary construction and provided with spaced cross-pieces 50 similar to those of the conveyor 11. The longitudinally disposed rods 51 of this conveyor are arranged similarly to those of the conveyor 11, except in that they are provided with wavy sections being of a vertical nature over which the potatoes in their rearward travel are compelled to pursue an irregular course calculated to free them of whatever vines or other débris that may be still clinging to them.

This rear conveyor is further provided with a chute 53 adapted to prevent the potatoes from falling off the conveyor while being carried rearwardly. This conveyor is rearwardly inclined with its outer end projecting somewhat beyond the end of the frame of the apparatus for the accommodation of a sorting and sacking attachment 54, shown in Figures 1 and 2 in dot-and-dash lines and forming the subject matter of a co-pending application.

To meet requirements when this attachment is desired to be employed, the rear end of the conveyor is sufficiently raised to permit the coupling on to the apparatus of a trailer 55, as a means for handling expeditiously the potatoes as sacked.

Obviously, though designed particularly for potato harvesting, there are divers other applications wherein the apparatus would prove equally valuable, as, for instance, in the harvesting of beets, turnips, and like farm products.

In recapitulation.

The conveyor 11 would be dropped into the position shown in Figure 1, the lever 21 manipulated for the adjustment of the plowshare 14 for the required digging depth, and the machine drawn over the ground to be dug by any power adapted to meet requirements. Once in motion, the potatoes together with such other matter as may adhere thereto, are plowed, or rather scooped up by the plowshare 14, and cast upon the adjacent, or forward, end of the conveyor 11, to be thence carried rearwardly and upwardly by this conveyor until the section 29 is reached, at which point the potatoes are received by the rods 30, these rods being sufficiently spaced apart to permit the potatoes to drop through and be received by the lower conveyor 33, the vines, débris, and such potatoes as may be still clinging to the vines being passed on and thrown upon the transverse carrier and vine separator 34, where, through the peculiar cross action of this carrier the remaining potatoes are removed and the vines and coarser débris conveyed to one side for disposal.

What I claim and desire to secure by Letters Patent of the United States is the following:—

1. In an apparatus of the character described, the combination with a portable supporting frame, of a swingable conveyor disposed in the forward end of the frame, a plow carried by the outer end of said conveyor and adapted for angular adjustment relative thereto, a second conveyor mounted in said frame below the first conveyor and adapted to receive therefrom discharged articles, the rear of said swingable conveyor being in overlapped relation with the forward portion of said second conveyor, and co-directionally arranged relative thereto and means for driving said conveyors in a common direction and at common speed.

2. In an apparatus of the character described, the combination with a portable frame, of a swingable conveyor disposed in the forward end of the frame, a plow carried by the forwardly projecting end of said conveyor and adapted for adjustment relative thereto, a second conveyor mounted in said frame below the first conveyor, the first conveyor being arranged in overlapped relation with the second conveyor, a transversely disposed separator and carrier co-operatively arranged relative to both of said conveyors, and means for driving said conveyors in a common direction and said separator and carrier in a direction at right angles to the travel of said conveyors.

3. In an apparatus of the character described, the combination with a portable frame, of a swingable conveyor mounted in the forward end thereof, an adjustable plow carried by the forward end of said conveyor for rooting up and depositing articles thereupon, a second relatively fixed conveyor mounted in said frame with its forward end projecting under and beyond the rearmost end of said swingable conveyor, means co-operatively associated with said conveyors for carrying rearwardly articles unearthed by said plow and separating the débris therefrom during said carriage, and driving means borne by said frame adapted for the actuation of said conveyors in a common direction and at a common speed.

4. In a device of the class described, the combination with a portable supporting frame, of a swingable conveyor disposed in the forward end of said frame, lever operated means coactively associated with said conveyor for raising and lowering the forward end thereof, an adjustable plowshare mounted upon the forward end of said conveyor for uprooting and depositing articles thereon, a second relatively fixed conveyor mounted in said frame with its forward end projecting beneath and beyond the rearmost end of said swingable conveyor, said swingable conveyor consisting of longitudinally disposed rods and chain-carriers coacting therewith to convey articles rearwardly and to sift foreign matter therefrom while being so conveyed, the said articles being thereafter discharged onto said fixed conveyor, and means for driving said conveyors in a common direction.

5. In a device of the class described, the combination with a portable frame, of a swingable conveyor disposed in the forward end of said frame, a plowshare mounted upon the forward end of said swingable conveyor for uprooting and depositing articles thereon, a second relatively fixed conveyor mounted in the frame with its forward end projecting beneath and beyond the rearmost end of said swingable conveyor, removable rods therefor both said conveyors comprising chain-carriers and longitudinally disposed and spaced rods coacting therewith to bear the garnered articles rearwardly, the swingable conveyor being provided at its upper end with a section in which said removable rods are of wider spacing than those of the lower end to permit freely the passage therethrough of the articles to the fixed conveyor below, and means for driving said conveyors.

6. In a device of the class described, the combination with a portable frame, of a swingable conveyor disposed in the forward end of the frame, a plowshare mounted in the forward end of said swingable conveyor for uprooting and depositing articles thereon, a second relatively fixed conveyor mounted in the frame with its forward end projecting beneath and beyond the rearmost end of said swingable conveyor, both said conveyors comprising chain-carriers and longitudinally disposed and spaced rods coacting therewith to bear the garnered articles rearwardly, the swingable conveyor being provided at its upper end with a section in which the rods are corrugated or waved, and means for driving said conveyors in a common direction and at common speed.

LOUIS STOLTENBERG.